United States Patent
Kang et al.

(10) Patent No.: US 11,961,682 B2
(45) Date of Patent: Apr. 16, 2024

(54) MULTILAYER CAPACITOR AND BOARD HAVING THE SAME MOUNTED THEREON

(71) Applicant: SAMSUNG ELECTRO-MECHANICS CO., LTD., Suwon-si (KR)

(72) Inventors: Sim Chung Kang, Suwon-si (KR); Yong Park, Suwon-si (KR); Woo Chul Shin, Suwon-si (KR); Ki Pyo Hong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 18/143,738

(22) Filed: May 5, 2023

(65) Prior Publication Data

US 2023/0274887 A1    Aug. 31, 2023

Related U.S. Application Data

(63) Continuation of application No. 17/501,227, filed on Oct. 14, 2021, now Pat. No. 11,682,528, which is a (Continued)

(30) Foreign Application Priority Data

Aug. 16, 2019 (KR) .................. 10-2019-0100293

(51) Int. Cl.
*H01G 4/30* (2006.01)
*H01G 2/06* (2006.01)
(Continued)

(52) U.S. Cl.
CPC .............. *H01G 4/30* (2013.01); *H01G 2/065* (2013.01); *H01G 4/012* (2013.01); *H01G 4/1209* (2013.01)

(58) Field of Classification Search
CPC .......... H01G 4/30; H01G 4/065; H01G 4/012; H01G 4/1209; H01G 4/1227; H01G 4/33; H01G 4/248
See application file for complete search history.

(56) References Cited

U.S. PATENT DOCUMENTS

| | | | |
|---|---|---|---|
| 11,177,072 B2 * | 11/2021 | Kang | H01G 4/30 |
| 2004/0014584 A1 * | 1/2004 | Dernovsek | C03C 14/004 501/139 |

(Continued)

FOREIGN PATENT DOCUMENTS

| | | |
|---|---|---|
| JP | 5224074 B2 | 7/2013 |
| JP | 2017-147358 A | 8/2017 |

OTHER PUBLICATIONS

Notice of Allowance issued in corresponding U.S. Appl. No. 17/501,227 dated Feb. 15, 2023.
(Continued)

*Primary Examiner* — Michael P McFadden
(74) *Attorney, Agent, or Firm* — MORGAN, LEWIS & BOCKIUS LLP

(57) ABSTRACT

A multilayer capacitor includes a capacitor body including dielectric layers and first and second internal electrodes, the capacitor body having first to sixth surfaces, the first internal electrode being exposed through the third, fifth, and sixth surfaces, and the second internal electrode being exposed through the fourth, fifth, and sixth surfaces, a first side portion and a second side portion, respectively disposed on the fifth surface and the sixth surface of the capacitor body, and a first external electrode and a second external electrode, respectively connected to the third surface and the fourth surface of the capacitor body to be respectively connected to the first internal electrode and the second internal electrode. The first and second side portions include an acicular second phase including a glass including aluminum (Al) and silicon (Si), manganese (Mn), and phosphorus (P).

18 Claims, 3 Drawing Sheets

Related U.S. Application Data continuation of application No. 16/779,960, filed on Feb. 3, 2020, now Pat. No. 11,177,072.

(51) Int. Cl.
*H01G 4/012* (2006.01)
*H01G 4/12* (2006.01)

(56) References Cited

U.S. PATENT DOCUMENTS

2006/0228534 A1* 10/2006 Weil .................. C04B 41/52
                                                    428/209
2007/0281850 A1* 12/2007 Beall ................ C03C 10/0045
                                                    501/10
2011/0157769 A1*  6/2011 Kang .................... H01G 4/30
                                                    501/137
2012/0033344 A1    2/2012 Nakamura
2018/0162780 A1*  6/2018 Kaneda ............. C22C 32/0026
2018/0301282 A1* 10/2018 Nishikawa ........ C04B 35/62272
2019/0371528 A1* 12/2019 Takashima ............ H01G 4/228

OTHER PUBLICATIONS

Office Action issued in corresponding U.S. Appl. No. 17/501,227 dated Sep. 21, 2022.

* cited by examiner

II-II'

MULTILAYER CAPACITOR AND BOARD HAVING THE SAME MOUNTED THEREON

CROSS-REFERENCE TO RELATED APPLICATIONS

This application is the continuation application of U.S. patent application Ser. No. 17/501,227 filed on Oct. 14, 2021, which is the continuation application of U.S. patent application Ser. No. 16/779,960 filed on Feb. 3, 2020, which claims the benefit under 35 USC 119(a) of Korean Patent Application No. 10-2019-0100293 filed on Aug. 16, 2019 in the Korean Intellectual Property Office, the entire disclosures of which are incorporated herein by reference for all purposes.

TECHNICAL FIELD

The present disclosure relates to a multilayer capacitor and a board having the same mounted thereon.

BACKGROUND

A multilayer capacitor is widely used as an information technology (IT) component of a computer, a personal digital assistant (PDA), a mobile phone, and the like, due to advantageous thereof such as small size, high capacitance, and ease of mounting. Also, the multilayer capacitor is widely used as an electrical component due to characteristics thereof such as high reliability and high strength.

With the recent trend for miniaturization and multifunctionalization of electronic devices, a multilayer capacitor is also required to have a small size and high capacitance. To this end, a multilayer capacitor, having a structure in which an internal electrode is exposed in a width direction of a capacitor body to significantly increase an area of the internal electrode in the width direction, has been manufactured.

In a multilayer capacitor having such a structure, a capacitor body is manufactured and side portions are respectively attached to both surfaces of the capacitor body in the width direction during a pre-sintering process, such that the side portions cover exposed portions of the internal electrode.

However, a multilayer capacitor, having such a structure in which side portions are attached after the internal electrode is exposed in a width direction of a capacitor body as described above, may suffer from degradation in moisture resistance reliability and toughness resulting from shrinkage after sintering.

SUMMARY

An aspect of the present disclosure is to provide a multilayer capacitor, capable of increasing capacitance and improving moisture resistance reliability and toughness, and a mounting board of the multilayer capacitor.

According to an aspect of the present disclosure, a multilayer capacitor includes a capacitor body including dielectric layers and first and second internal electrodes, the capacitor body having a first surface and a second surface opposing each other, a third surface and a fourth surface, connected to the first surface and the second surface and opposing each other, and a fifth surface and a sixth surface, connected to the third surface and the fourth surface and opposing each other, the first internal electrode being exposed through the third, fifth, and sixth surfaces, and the second internal electrode being exposed through the fourth, fifth, and sixth surfaces, a first side portion and a second side portion, respectively disposed on the fifth surface and the sixth surface of the capacitor body, and a first external electrode and a second external electrode, respectively connected to the third surface and the fourth surface of the capacitor body to be respectively connected to the first internal electrode and the second internal electrode. The first and second side portions include an acicular second phase including a glass including aluminum (Al) and silicon (Si), manganese (Mn), and phosphorus (P).

A major axis of the second phase of the first and second side portions may have a length of 1 to 10 μm.

The dielectric layer may have an average thickness of 0.4 μm or less.

Each of the first and second internal electrodes may have an average thickness of 0.41 μm or less.

The number of the first and second internal electrodes laminated may be 400 or more.

Each of the first and second side portions may have an average thickness of 10 to 20 μm.

The capacitor body may include an active region, in which the first and second internal electrodes overlap each other, and upper and lower cover regions, respectively disposed on upper and lower surfaces of the active region.

Each of the upper and lower cover regions may have a thickness of 20 μm or less.

Each of the first and second external electrodes may have an average thickness of 10 μm or less.

The first and second external electrodes may respectively include first and second connection portions, respectively disposed on the third and fourth surfaces of the capacitor body to be respectively connected to the first and second internal electrodes, and first and second band portions, respectively extending from the first and second connection portions to a portion of the first surface of the capacitor body.

According to another aspect of the present disclosure, a mounting board of a multilayer capacitor includes a substrate, including first and second electrode pads on one surface thereof, and a multilayer capacitor mounted such that first and second external electrodes are respectively connected to the first and second electrode pads.

According to another aspect of the present disclosure, a multilayer capacitor includes a capacitor body including dielectric layers and first and second internal electrodes, the capacitor body having a first surface and a second surface opposing each other, a third surface and a fourth surface, connected to the first surface and the second surface and opposing each other, and a fifth surface and a sixth surface, connected to the third surface and the fourth surface and opposing each other, the first internal electrode being exposed through the third, fifth, and sixth surfaces, and the second internal electrode being exposed through the fourth, fifth, and sixth surfaces; a first side portion and a second side portion, respectively disposed on the fifth surface and the sixth surface of the capacitor body; and a first external electrode and a second external electrode, respectively connected to the third surface and the fourth surface of the capacitor body to be respectively connected to the first internal electrode and the second internal electrode. Each of the first and second side portions comprises one acicular second phase and another acicular second phase physically crosslinked. Each of the one acicular second phase and the another acicular second phase includes manganese (Mn), phosphorus (P), and a glass comprising aluminum (Al) and silicon (Si).

A major axis of each of the one acicular second phase and the another acicular second phase may have a length of 1 to 10 μm.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
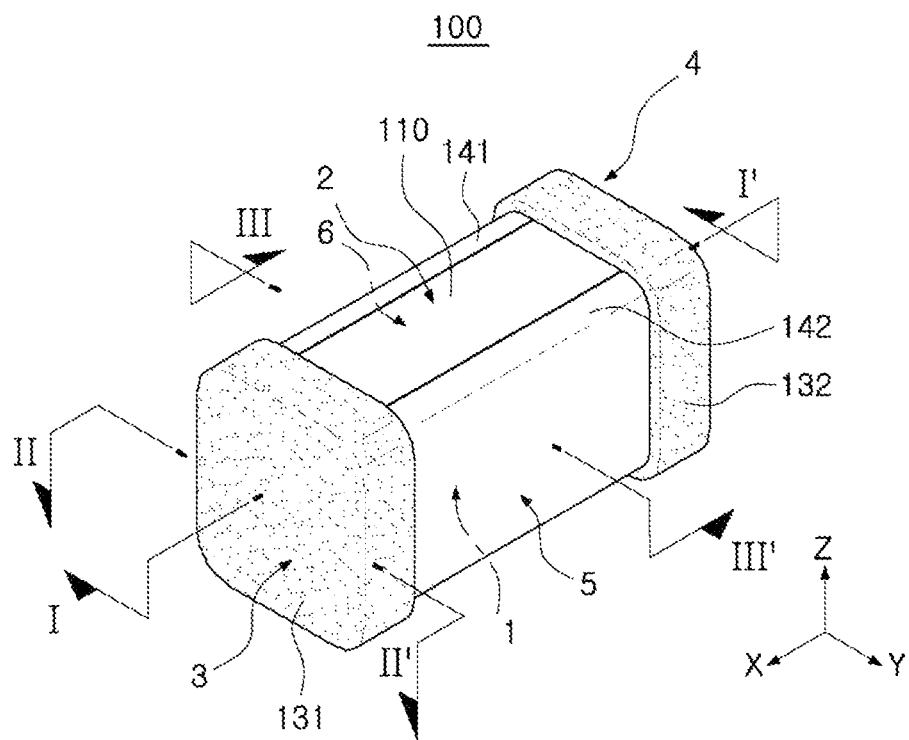
FIG. 1 is a perspective view illustrating a multilayer capacitor according to an embodiment of the present disclosure.

Hereinafter, embodiments of the present disclosure will be described as follows with reference to the attached drawings.

However, the present disclosure may be embodied in many different forms and should not be construed as being limited to the embodiments set forth herein.

Rather, these embodiments are provided so that this disclosure will be thorough and complete, and will fully convey the scope of the invention to those skilled in the art.

Accordingly, the shapes and dimensions of elements in the drawings may be exaggerated for clarity, and the same reference numerals will be used throughout to designate the same or like elements.

Further, the same reference numerals are used throughout the drawings for the elements having similar functions and activities.

In the specification, unless otherwise specifically indicated, when a certain part "includes" a certain component, it is understood that other components may be further included but are not excluded.

To clearly describe the example embodiments, X, Y, and Z indicated in the drawings are defined to represent a length direction, a width direction, and a thickness direction of a multilayer capacitor, respectively.

Additionally, the Z direction may be used in the same sense as a lamination direction in which the dielectric layers are laminated.

Figure 2:
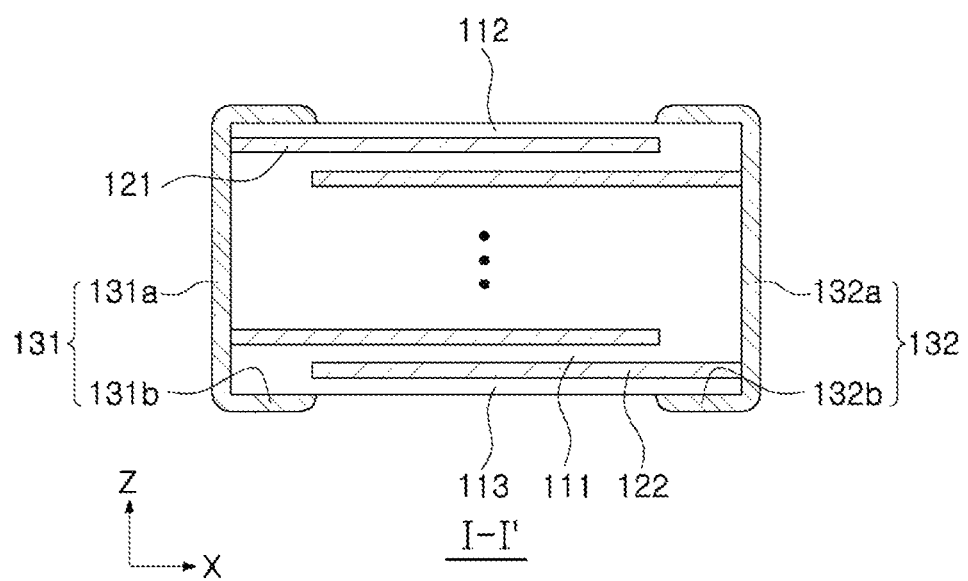
FIG. 2 is a cross-sectional view taken along line I-I' in FIG. 1.
Figure 3A:
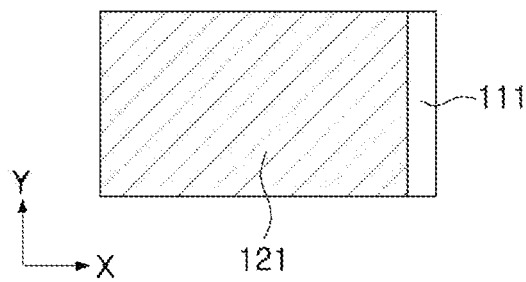
FIGS. 3A and 3B are plan views illustrating laminated structures of first and second internal electrodes of the multilayer capacitor in FIG. 1, respectively.
Figure 3B:
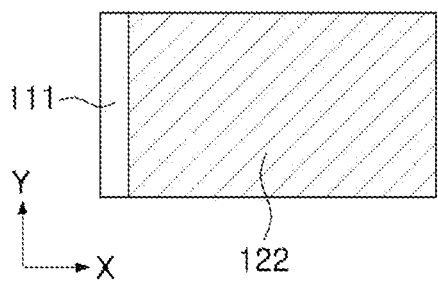
Figure 4:
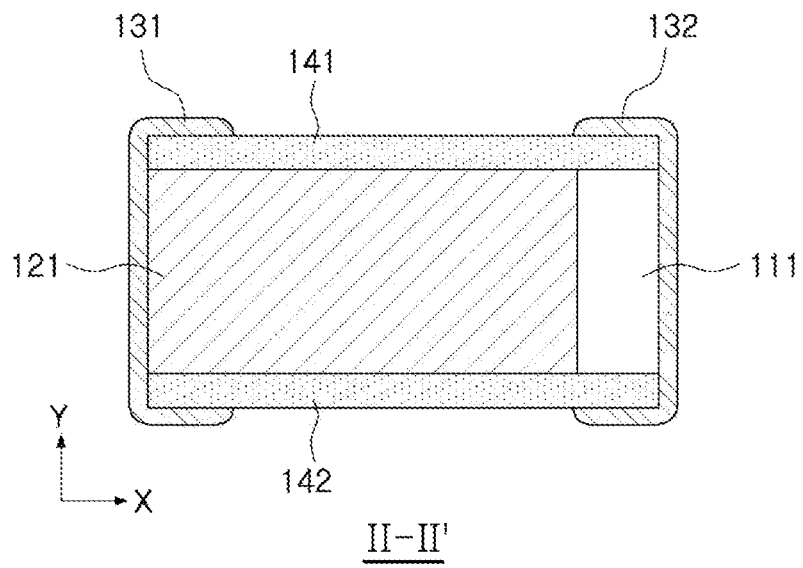
FIG. 4 is a cross-sectional view taken along line II-II' in FIG. 1.
Figure 5:
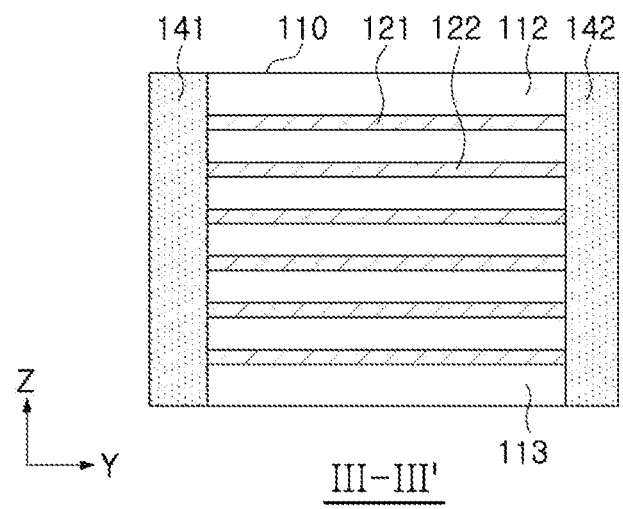
FIG. 5 is a cross-sectional view taken along line in FIG. 1.

FIG. 1 is a perspective view illustrating a multilayer capacitor according to an embodiment of the present disclosure, FIG. 2 is a cross-sectional view taken along line I-I' in FIG. 1, FIGS. 3A and 3B are plan views illustrating laminated structures of first and second internal electrodes of the multilayer capacitor in FIG. 1, respectively, FIG. 4 is a cross-sectional view taken along line II-II' in FIG. 1, and FIG. is a cross-sectional view taken along line in FIG. 1.

Hereinafter, a multilayer capacitor according to this embodiment will be described with reference to FIGS. 1 to 5.

Referring to FIGS. 1 to 5, a multilayer capacitor 100 includes a capacitor body 110, first and second side portions 141 and 142, and first and second external electrodes 131 and 132.

The capacitor body 110 is in a sintered state after a plurality of dielectric layers 111 are laminated in a Z direction, and adjacent dielectric layers 111 may be integrated with each other such that boundaries therebetween are not readily apparent without a scanning electron microscope (SEM).

The capacitor body 110 may include a plurality of dielectric layers 111 and first and second internal electrodes 121 and 122, having polarities opposite to each other, alternately disposed in the Z direction with respective dielectric layers 111 interposed therebetween.

The capacitor body 110 may include an active region, as a portion contributing to forming capacitance of a capacitor, in which the first and second internal electrodes 121 and 122 are alternately disposed with respective dielectric layers 111 interposed therebetween, and upper and lower cover regions 112 and 113, provided on upper and lower surfaces of the active regions in the Z direction, as a margin portion.

In this case, each of the upper and lower cover regions 112 and 113 may have a thickness of 20 μm or less.

A shape of the capacitor body 110 is not limited, but may be substantially hexahedral. The capacitor body 110 may have first and second surfaces 1 and 2 opposing each other in the Z direction, third and fourth surfaces 3 and 4, connected to the first and second surfaces 1 and 2, opposing each other in an X direction, and fifth and sixth surfaces 5 and 6, connected to the first and second surfaces 1 and 2 as well as to the fifth and sixth surfaces 5 and 6, opposing each other in a Y direction. In this embodiment, the first surface 1 may be amounted surface of the multilayer capacitor 100.

The dielectric layer 111 may include ceramic power particles, for example, $BaTiO_3$-based ceramic powder particles.

The $BaTiO_3$ (BT)-based ceramic powder may be $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, prepared by partially employing cesium (Ca), zirconium (Zr), and the like, in $BaTiO_3$, but the present disclosure is not limited thereto.

A ceramic additive, an organic solvent, a plasticizer, a binder, a dispersant, and the like, may be further added to the dielectric layer 111, together with the ceramic powder particles.

The ceramic additive may include, for example, a transition metal oxide or a transition metal carbide, a rare earth element, magnesium (Mg), aluminum (Al), or the like.

The first and second internal electrodes 121 and 122 are electrodes to which opposite polarities are applied, and may be disposed on respective dielectric layers 111 to be alternately laminated in the Z direction and may be alternately disposed inside the capacitor body in the Z direction with a single dielectric layer 111 therebetween.

In this case, the first and second internal electrodes 121 and 122 may be electrically insulated from each other by the dielectric layer 111 disposed therebetween.

The first internal electrode 121 is exposed through the third, fifth, and sixth surfaces 3, 5 and 6 of the dielectric layer 111.

In this case, the first internal electrode 121 may also be exposed through a corner, connecting the third surface 3 and the fifth surface 5 of the capacitor body 110, and a corner connecting the third surface 3 and the sixth surface 6 of the capacitor body 110.

The second internal electrode 122 is exposed through the fourth, fifth, and sixth surfaces 4, 5, and 6 of the dielectric layer 111.

In this case, the second internal electrode 122 may also be exposed through a corner, connecting the fourth surface 4 and the fifth surface 5 of the capacitor body 110, and a corner connecting the fourth surface 4 and the sixth surface 6 of the capacitor body 110.

In this case, end portions of the first and second internal electrodes 121 and 122, alternately exposed through the third and fourth surfaces 3 and 4 of the capacitor body 110, may be connected to the first and second external electrodes 131 and 132 disposed on both end portions of the capacitor body 110 in the X direction to electrically connected thereto, respectively.

According to the above configuration, charges are accumulated between the first and second internal electrodes 121 and 122 when a predetermined voltage is applied to the first and second external electrodes 131 and 132.

In this case, capacitance of the multilayer capacitor 100 is in proportion to an overlapping area of the first and second internal electrodes 121 and 122 overlapping each other in the Z direction in an active region.

As in this embodiment, when the first and second internal electrodes 121 and 122 are configured, not only basic areas of the first and second internal electrodes 121 and 122 but also a vertically overlapping area thereof is increased. Therefore, the capacitance of the multilayer capacitor 100 may be increased.

For example, when the area of the overlapping region of the first and second internal electrodes 121 and 122 is significantly increased, capacitance of a capacitor having even the same size may be significantly increased.

In addition, since a step, caused by lamination of internal electrodes, may be reduced to improve accelerated lifespan of insulation resistance, the multilayer capacitor 100 having improved capacitance characteristics and improved reliability may be provided.

In this case, a material of the first and second internal electrodes 121 and 122 is not limited, and the first and second internal electrodes 121 and 122 may be formed using a conductive paste including a precious metal material or at least one of nickel (Ni) and copper (Cu).

The conductive paste may be printed by screen printing, gravure printing, or the like, but a printing method of the conductive paste is not limited thereto.

An average thickness of the first and second internal electrodes 121 and 122 may be determined depending on purposes thereof and may be, for example, 0.41 μm or less.

In addition, the total number of the laminated first and second internal electrodes 121 and 122 may be 400 or more.

Accordingly, the multilayer capacitor 100 according to an example embodiment may be used as a component, requiring a large size and high capacitance, such as an IT component.

The first side portion 141 is disposed on the fifth surface 5 of the capacitor body 110, and the second side portion 142 is disposed on the sixth surface 6 of the capacitor body 110.

The first and second side portions 141 and 142 are in contact with tips of portions, exposed through the fifth and sixth surfaces 5 and 6 of the capacitor body from the first and second internal electrodes 121 and 122, to cover the tips.

The first and second side portions 141 and 142 serve to protect the capacitor body 110 and the first and second internal electrodes 121 and 122 from external impact and the like, and to secure insulation properties and moisture resistance reliability in the vicinity of the capacitor body 110.

The first and second side portions 141 and 142 include an acicular mullite second phase including a glass including aluminum (Al) and silicon (Si), manganese (Mn), and phosphorous (P). For example, the acicular mullite second phase includes manganese (Mn), phosphorous (P), and a glass including aluminum (Al) and silicon (Si). In one example, the first and second side portions 141 and 142 may be made of a material different from that of the dielectric layer 111.

Such a mullite second phase of this embodiment may be physically crosslinked to an adjacent mullite second phase to be physically linked thereto.

Accordingly, the first and second side parts 141 and 142 may have better resistance against external physical impact and may block a moisture penetration path into the capacitor body 110.

In addition, the second phase of the present disclosure may improve grain density of the first and second side portions 141 and 142 depending on a chemical low-temperature sintering action.

Accordingly, the first and second side parts 141 and 142 may have better resistance against external physical impact, and the water penetration path of the ceramic body 110 may be blocked.

The mullite second phase of this embodiment may improve the moisture resistance reliability and hardness of the capacitor body 110 to be relatively higher than those of other second phases, for example, a phosphate second phase.

An average thickness of the first and second side portions 141 and 142 in the Y direction may be 10 to 20 μm. In one example, an average thickness of each of the first and second side portions 141 and 142 in the Y direction may be 10 to 20 μm.

When the average thickness of the first and second side portions 141 and 142 in the Y direction is low, a ratio of the capacitor body 110 in a multilayer capacitor having the same standard may be increased. Thus, the capacitance of the multilayer capacitor 100 may also be increased.

In general, when an average thickness of the side portion is low, the moisture resistance reliability and toughness of the side portion may be degraded. However, the multilayer capacitor 100 according to this embodiment may include the first and second side portions 141 and 142, including the second phase, to prevent degradation in reliability and toughness of the multilayer capacitor 100 even when the average thickness of the first and second side portions 141 and 142 is low.

The acicular mullite second phase included in the first and second side portions 141 and 142 may have an acicular shape having a major axis and a minor axis.

In each of the first and second side portions 141 and 142, the major axis of the second phase may have a length of 1 to 10 μm.

When the major axis of the second phase of each of the first and second side portions 141 and 142 has a short length of 10 μm or less, moisture resistance reliability and hardness of the first and second side portions 141 and 142 and the capacitor body 110 may be degraded.

However, as in this embodiment, when the first and second side portions 141 and 142 include an acicular mullite second phase including a glass including Al and Si, Mn, and P, degradation in moisture resistance reliability and hardness of the first and second side portions 141 and 142 may be prevented even if the major axis of the second phase of each of the first and second side portions 141 and 142 has a length of 10 μm or less.

A phosphate-based glass according to the related art forms an acicular second phase after sintering. A second phase having a mullite composition according to this embodiment may have an acicular shape and may have a major axis having a larger size and a higher thickness than a major axis of a phosphate-based second phase including only a common P component. Thus, the moisture resistance and the hardness of the first and second side parts 141 and 142 may be further improved.

The first and second external electrodes 131 and 132 may be provided with voltages of polarities opposite to each other, and may be disposed on both end portions of the body 110 in the X direction. The first and second external electrodes 131 and 132 may be connected to portions exposed through the third and fourth surfaces 3 and 4 of the capacitor body 110 to be electrically connected thereto, respectively.

In this case, the first and second external electrodes 131 and 132 may have an average thickness of 10 µm or less. In one example, each of the first and second external electrodes 131 and 132 may have an average thickness of 10 µm or less.

Accordingly, the multilayer capacitor 100 may be miniaturized, and the manufacturing costs of the multilayer capacitor 100 may be reduced.

When the thickness of each of the first and second external electrodes 131 and 132 is low, the moisture resistance reliability and the hardness of the capacitor body 110 may be generally degraded. However, in this embodiment, the first and second side portions 141 and 142 include an acicular second phase including a glass including Al and Si, Mn, and P to prevent degradation in moisture resistance reliability and hardness even if each of the first and second external electrodes 131 and 132 has a thickness of 10 µm or less. As a result, miniaturization and reduced manufacturing costs of the multilayer capacitor 100 may be expected.

The first external electrode 131 may include a first connection portion 131a and a first band portion 131b.

The first connection portion 131a is disposed on the third surface 3 of the capacitor body 110 and is in contact with an end portion, exposed outwardly of the first internal electrode 121 through the third surface 3 of the capacitor body 110, to physically and electrically connect the first internal electrode 121 and the first external electrode 131 to each other.

The first band portion 131b is a portion extending from the first connection portion 131a to a portion of the first surface 1 of the capacitor body 110.

As necessary, in order to improve adhesive strength and the like, the first band portion 131b may further extend to the second, fifth, and sixth surfaces 2, 5, and 6 of the capacitor body 110 to cover one end portion of the side portions 141 and 142.

The second external electrode 132 may include a second connection portion 132a and a second band portion 132b.

The second connection portion 132a is disposed on the fourth surface 4 of the capacitor body 110 and is in contact with an end portion, exposed outwardly of the second internal electrode 122 through the fourth surface 4 of the capacitor body 110, to physically and electrically connect the second internal electrode 122 and the second external electrode 132 to each other.

Each of the first and second external electrodes 131 and 132 may include a plating layer for at least a portion of structural reliability, ease of board mounting, durability to the outside, heat resistance, and equivalent series resistance (ESR).

For example, the plating layer may be formed by sputtering or electric deposition, but a method of forming the plating layer is not limited thereto.

The plating layer may include a largest amount of nickel, but is not limited thereto. The plating layer may be implemented using copper (Cu), palladium (Pd), platinum (Pt), gold (Au), silver (Ag), lead (Pb) alone, or alloys including at least one thereof.

According to this embodiment, the first and second side portions 141 and 142 include an acicular mullite second phase including a glass including Al and Si, Mn, and P. As a result, the strength of the first and second side portions 141 and 142 may be improved by 30% or more, as compared with the side portions, not including the second phase.

In addition, cracking resistance of the first and second side portions 141 and 142 may be increased to improve the moisture resistance reliability of the multilayer capacitor 100.

In this embodiment, the dielectric layer 111 may have an average thickness of 0.4 µm or less. Since the thickness of the dielectric layer 111 corresponds to a distance between the first and second internal electrodes 121 and 122, the capacitance of the multilayer capacitor 100 may be improved when the thickness of the dielectric layer 111 is low.

The first and second internal electrodes 121 and 122 may have an average thickness of be 0.41 µm or less. For example, each of the first and second internal electrodes 121 and 122 may have an average thickness of be 0.41 µm or less.

Since the multilayer capacitor 100 of this embodiment has a structure in which the first and second internal electrodes 121 and 122 are exposed through the fifth and sixth surfaces 5 and 6 of the capacitor body 110, a step with respect to the capacitor body 110 may be reduced on end portions of the first and second internal electrodes 121 and 122 in the Y direction.

Accordingly, even when the thickness of the dielectric layer 111 and the first and second internal electrodes 121 and 122 is reduced as described above to achieve multilayer thinning, there is no significant problem with the reliability of the multilayer capacitor 100. Therefore, the reliability may also be secured while increasing the capacity of the capacitor 100.

In addition, when the average thickness of the first and second internal electrodes 121 and 122 is reduced as described above, shrinkage after sintering may be decreased. Therefore, a diameter of a void in the end portion of the capacitor body 110 may be further reduced to further improve the reliability of the multilayer capacitor 100.

Figure 6:
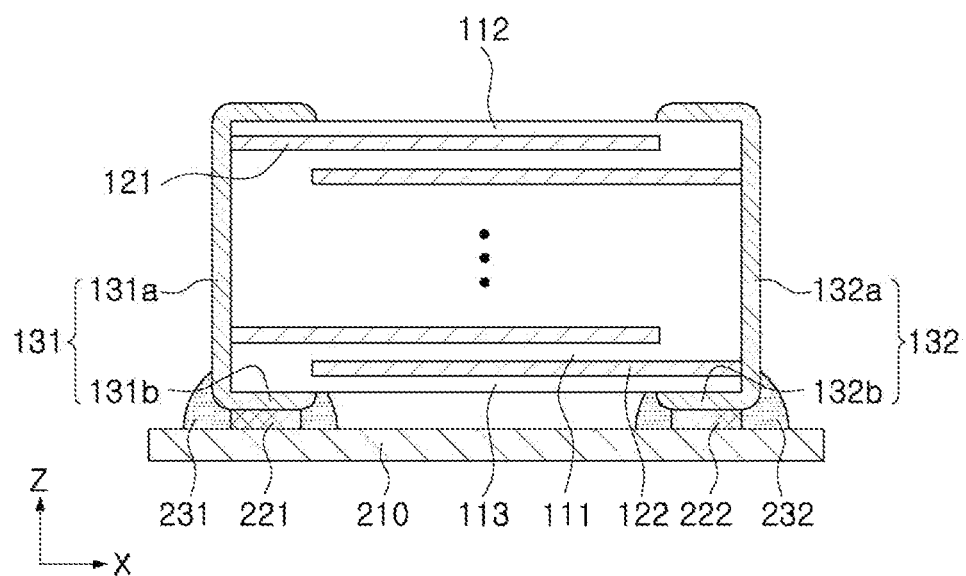
FIG. 6 is a schematic cross-sectional view of a board on which the multilayer capacitor, illustrated in FIG. 1, is mounted.

Referring to FIG. 6, a mounting board of a multilayer capacitor according to this embodiment may include a substrate 210, including first and second electrode pads 221 and 222 on one surface thereof, and a multilayer capacitor 100 mounted such that first and second external electrodes 131 and 141 are respectively connected to the first and second electrode pads 221 and 222 on an upper surface of the substrate 210.

In this embodiment, the multilayer capacitor 100 is illustrated and described as being mounted on the substrate 210 by solders 231 and 232 but, as necessary, a conductive paste may be used rather than a solder.

As described above, an internal electrode may be exposed in a width direction of a capacitor body to increase capacitance of a multilayer capacitor, and a side portion may include an acicular mullite second phase including a glass including Al and Si, Mn, and P to improve moisture resistance reliability and toughness of the multilayer capacitor depending on a physical crosslinking action and a chemical low-temperature sintering action of the second phase of the side portion.

While embodiments have been shown and described above, it will be apparent to those skilled in the art that modifications and variations could be made without departing from the scope of the present disclosure as defined by the appended claims.

What is claimed is:

1. A multilayer capacitor comprising:
a capacitor body including dielectric layers and first and second internal electrodes, the capacitor body having a first surface and a second surface opposing each other, a third surface and a fourth surface, connected to the first surface and the second surface and opposing each other, and a fifth surface and a sixth surface, connected to the third surface and the fourth surface and opposing each other, the first internal electrode being exposed through the third, fifth, and sixth surfaces, and the second internal electrode being exposed through the fourth, fifth, and sixth surfaces;
a first side portion and a second side portion, respectively disposed on the fifth surface and the sixth surface of the capacitor body; and
a first external electrode and a second external electrode, respectively connected to the third surface and the fourth surface of the capacitor body to be respectively connected to the first internal electrode and the second internal electrode,
wherein the first and second side portions comprise an second phase including a glass comprising aluminum (Al) and silicon (Si), manganese (Mn), and phosphorus (P),
wherein each of the first and second side portions has an average thickness of 10 to 20 μm, and
wherein the capacitor body comprises an active region, in which the first and second internal electrodes overlap each other, and upper and lower cover regions, respectively disposed on upper and lower surfaces of the active region.

2. The multilayer capacitor of claim 1, wherein the first and second side portions further comprise another acicular second phase including manganese (Mn) and phosphorus (P).

3. The multilayer capacitor of claim 1, wherein a major axis of the second phase of the first and second side portions has a length of 1 to 10 μm.

4. The multilayer capacitor of claim 1, wherein the dielectric layer has an average thickness of 0.4 μm or less.

5. The multilayer capacitor of claim 1, wherein the number of the first and second internal electrodes is 400 or more.

6. The multilayer capacitor of claim 1,
wherein each of the first and second internal electrodes has an average thickness of 0.41 μm or less.

7. The multilayer capacitor of claim 1, wherein each of the upper and lower cover regions has a thickness of 20 μm or less.

8. The multilayer capacitor of claim 1, wherein each of the first and second external electrodes has an average thickness of 10 μm or less.

9. The multilayer capacitor of claim 1, wherein the first and second external electrodes respectively comprise:
first and second connection portions, respectively disposed on the third and fourth surfaces of the capacitor body to be respectively connected to the first and second internal electrodes; and
first and second band portions, respectively extending from the first and second connection portions to a portion of the first surface of the capacitor body.

10. A multilayer capacitor comprising:
a capacitor body including dielectric layers and first and second internal electrodes, the capacitor body having a first surface and a second surface opposing each other, a third surface and a fourth surface, connected to the first surface and the second surface and opposing each other, and a fifth surface and a sixth surface, connected to the third surface and the fourth surface and opposing each other, the first internal electrode being exposed through the third, fifth, and sixth surfaces, and the second internal electrode being exposed through the fourth, fifth, and sixth surfaces;
a first side portion and a second side portion, respectively disposed on the fifth surface and the sixth surface of the capacitor body; and
a first external electrode and a second external electrode, respectively connected to the third surface and the fourth surface of the capacitor body to be respectively connected to the first internal electrode and the second internal electrode,
wherein the first and second side portions comprise an second phase including a glass comprising aluminum (Al) and silicon (Si),
wherein the dielectric layer has an average thickness of 0.4 μm or less.

11. The multilayer capacitor of claim 10, wherein the first and second side portions further comprise another second phase including manganese (Mn) and phosphorus (P).

12. The multilayer capacitor of claim 10, wherein a major axis of the second phase of the first and second side portions has a length of 1 to 10 μm.

13. The multilayer capacitor of claim 10, wherein the number of the first and second internal electrodes is 400 or more.

14. The multilayer capacitor of claim 10, wherein each of the first and second side portions has an average thickness of 10 to 20 μm.

15. The multilayer capacitor of claim 10, wherein the capacitor body comprises an active region, in which the first and second internal electrodes overlap each other, and upper and lower cover regions, respectively disposed on upper and lower surfaces of the active region.

16. The multilayer capacitor of claim 15, wherein each of the upper and lower cover regions has a thickness of 20 μm or less.

17. The multilayer capacitor of claim 10, wherein each of the first and second external electrodes has an average thickness of 10 μm or less.

18. The multilayer capacitor of claim 10, wherein the first and second external electrodes respectively comprise:
first and second connection portions, respectively disposed on the third and fourth surfaces of the capacitor body to be respectively connected to the first and second internal electrodes; and
first and second band portions, respectively extending from the first and second connection portions to a portion of the first surface of the capacitor body.

\* \* \* \* \*